US008117285B1

(12) United States Patent
Katzer et al.

(10) Patent No.: US 8,117,285 B1
(45) Date of Patent: Feb. 14, 2012

(54) SYSTEM AND METHOD FOR BUNDLED CONTENT DELIVERY

(75) Inventors: Robin Dale Katzer, Olathe, KS (US); Craig A. Macha, Carrollton, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 71 days.

(21) Appl. No.: 12/635,176

(22) Filed: Dec. 10, 2009

(51) Int. Cl.
*G06F 13/00* (2006.01)
(52) U.S. Cl. .................... 709/219; 709/225; 709/250
(58) Field of Classification Search .................. 709/217, 709/219, 223, 225, 250
See application file for complete search history.

(56) References Cited

U.S. PATENT DOCUMENTS

| 7,089,594 | B2 * | 8/2006 | Lal et al. ........................ 726/31 |
| 7,320,024 | B2 * | 1/2008 | Oku ............................. 709/217 |
| 2005/0132083 | A1 * | 6/2005 | Raciborski et al. ........... 709/232 |
| 2007/0011713 | A1 * | 1/2007 | Abramson et al. ............ 725/113 |
| 2011/0021219 | A1 * | 1/2011 | LeBlanc et al. ............... 455/466 |

* cited by examiner

*Primary Examiner* — Viet Vu (57) ABSTRACT

A mobile communication device is provided. The mobile communication device comprises a processor, a memory, a display, a radio transceiver, and an application stored in the memory. The application, when executed by the processor, transmits via the radio transceiver a first hyper text transport protocol message identifying a markup language content file embedding a plurality of links to additional content, wherein the first hyper text transport protocol message establishes a hyper text transport protocol connection. The application receives via the radio transceiver a second hyper text transport protocol message from the hyper text transport protocol connection containing the markup language content file and a plurality of files identified by the links to additional content and presents the markup language content file and the plurality of files on the display.

20 Claims, 7 Drawing Sheets

SYSTEM AND METHOD FOR BUNDLED CONTENT DELIVERY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a variety of applications, a system or device may request information via a network wherein the request may entail more than one portion of data in order to fulfill the request. In some cases, as with a mobile device, such as a handset or mobile phone, collecting the portions of data to fulfill the request may involve multiple requests to a location or locations, as in a server. Each request/reply action may involve some form of initiation and termination protocols, as in establishing a connection, requesting/receiving data, and terminating the connection.

SUMMARY

In an embodiment, a mobile communication device is disclosed. The mobile communication device comprises a processor, a memory, a display, a radio transceiver, and an application stored in the memory. The application, when executed by the processor, transmits via the radio transceiver a first hyper text transport protocol message identifying a markup language content file embedding a plurality of links to additional content, wherein the first hyper text transport protocol message establishes a hyper text transport protocol connection. The application receives via the radio transceiver a second hyper text transport protocol message from the hyper text transport protocol connection containing the markup language content file and a plurality of files identified by the links to additional content and presents the markup language content file and the plurality of files on the display.

In an embodiment, a server computer is disclosed. The server computer comprises a processor, a memory, and an application stored in the memory. The application, when executed by the processor, receives a first hyper text transport protocol message identifying a markup language content file embedding a plurality of links to additional content, wherein the first hyper text transport protocol message establishes a hyper text transport protocol connection. The application retrieves the markup language content file and parses the markup language content file to identify the embedded links. The application retrieves at least one subordinate file based on at least one of the embedded links and bundles the markup language content file and the at least one subordinate file into a bundle. The application transmits a second hyper text transport protocol message via the hyper text transport protocol connection containing the bundle.

In an embodiment, a mobile communication device is disclosed. The mobile communication device comprises a processor, a memory, a display, a radio transceiver, and an application stored in the memory. The application, when executed by the processor, transmits via the radio transceiver a first hyper text transport protocol message identifying a markup language content file embedding a plurality of links to additional content, wherein the first hyper text transport protocol message establishes a first hyper text transport protocol connection. The application receives via the radio transceiver a second hyper text transport protocol message from the first hyper text transport protocol connection containing the markup language content file and parses the markup language content file to identify the plurality of links. The application transmits via the radio transceiver a third hyper text transport protocol message identifying the links, wherein the third hyper text transport protocol message establishes a second hyper text transport protocol connection. The application receives via the radio transceiver a fourth hyper text transport protocol message from the second hyper text transport protocol connection containing a plurality of files identified by the plurality of links and presents the markup language content file and the plurality of files on the display.

In an embodiment a method is disclosed. The method comprises a server computer retrieving a plurality of content files, the server computer bundling the plurality of content files together into a bundle, the bundle further comprising a plurality of references, each reference identifying a source of one of the content files, the bundle further identifying a length of each content file and a type of each content file, and the server computer transmitting the bundle via a single hyper text transport protocol session to a mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method are described that provide handling of data transmitted to a mobile device via a network. In an embodiment, a user of a mobile device may request information from a server by way of a wireless network, wherein the information may be, for example, a web page. The web page may contain links to data which may include but is not limited to text, graphics, images, hyperlinks, and/or other forms of data, some of which may not be located on the server, itself. The data being requested may be of a variety of forms including hyper text markup language (HTML), extensible markup language (XML), standard generalized markup language (SGML), binary data, and/or other.

Currently, when a mobile device requests information, such as a web page from a server, it first initiates an HTTP session with the server and requests the web page. The server returns a markup language document to the mobile device providing details of the web page, which may include embedded links to other information needed to complete the web page. The mobile device may then generate an HTTP session with a content server that contains information associated with one of the links. It may then request the portion of information that is located on the content server and subsequently receive the requested information via a reply message from the content server. The HTTP session between the mobile device and the content server is then terminated. This process may then be repeated to retrieve additional portions of information contained on the current content server. If additional portions of information are contained on additional servers, the same procedure of establishing an HTTP connection, requesting information, receiving information, and terminating the HTTP session will result. In essence, each portion of information of the markup language document will require a separate HTTP session, whether the portions of information are all located on one content server or are on any number of additional content servers.

In addition, management of multiple HTTP sessions can result in the generation of threads which may occupy the processor of the mobile device. Threads, as known to those skilled in the art, may be separate tasks or paths of execution. While gathering the information of the request, these threads may continue processing when the user of the mobile device has shifted focus to other tasks, and may present the results of the threads at an inappropriate time in such a way that may cause a distraction to the user. For example, a user of a mobile device may request a web page, and then switch to another application, such as a calendar application, while the request is being processed. In such instances, the thread or threads may continue to run as availability of the processor of the mobile device allows. When the thread or threads have completed their tasks and the mobile device assembles the web page for display, the web page may pop up and obscure the calendar on which the user is now focusing. The management of multiple HTTP sessions, the spawning of multiple threads, and the resource consumption that may result from these issues may impair the performance of the mobile device and thereby provide a negative experience for the user of the mobile device.

In one embodiment of this disclosure, the mobile device initiates an HTTP session with a server and sends a request message for information, such as a web page. The server may then respond to the mobile device with a reply message containing a markup language document which contains information of the requested web page. The HTTP session is then terminated. The mobile device parses the markup language document to identify links to additional information needed to complete the requested web page. The mobile device may then initiate a second HTTP session with the server and send a second request message, including the embedded links in the order they were parsed in the markup language document, requesting that the server collect all information referenced by the links from any/all sources, and then bundle the information in the order specified by the second request message into a single content message and return it to the mobile device. The server gathers the information described in the second request message and stores the information temporarily in, for example, its internal memory. It then bundles the information in the order specified by the second request message and returns the bundled information to the mobile device. The HTTP session is then terminated. The mobile device may then process the information in the bundle it received in the reply message and, for example, display it on the display of the mobile device. This may allow the mobile device to retrieve the desired web page in two HTTP sessions with one server.

In another embodiment, the mobile device establishes an HTTP session with the server and sends a request message for information, such as a web page. The request message may specify that the server parse the markup language document associated with the request to identify any embedded links referenced in the markup language document, manage the HTTP sessions with each content server containing the information of the requested web page, gather all available information of the web page, bundle the information in the order specified in the markup language document, and then return it to the mobile device in a content message. The server may then manage any/all HTTP sessions, request/reply messages, information gathering, temporary storage, and proper ordering of the information needed to fulfill the request. It may then return the information of the web page to the mobile device in a single reply message. The HTTP session between the mobile device and the server may then be terminated.

This process may allow the mobile device to retrieve the desired web page in one HTTP session with one server. The mobile device may then process the information in the bundle it received in the reply message and, for example, display it on the display of the mobile device. While the total number of HTTP sessions employed in gathering the available information of the requested web page does not necessarily change in the embodiments of this disclosure, the delegation of managing the bulk of the HTTP sessions to the content server or servers may provide a means of reducing the resource demands on the mobile device and may prevent some of the resultant performance issues on the mobile device. This may, in turn, lead to an improved user experience when requesting information from a server via a network.

Figure 1:
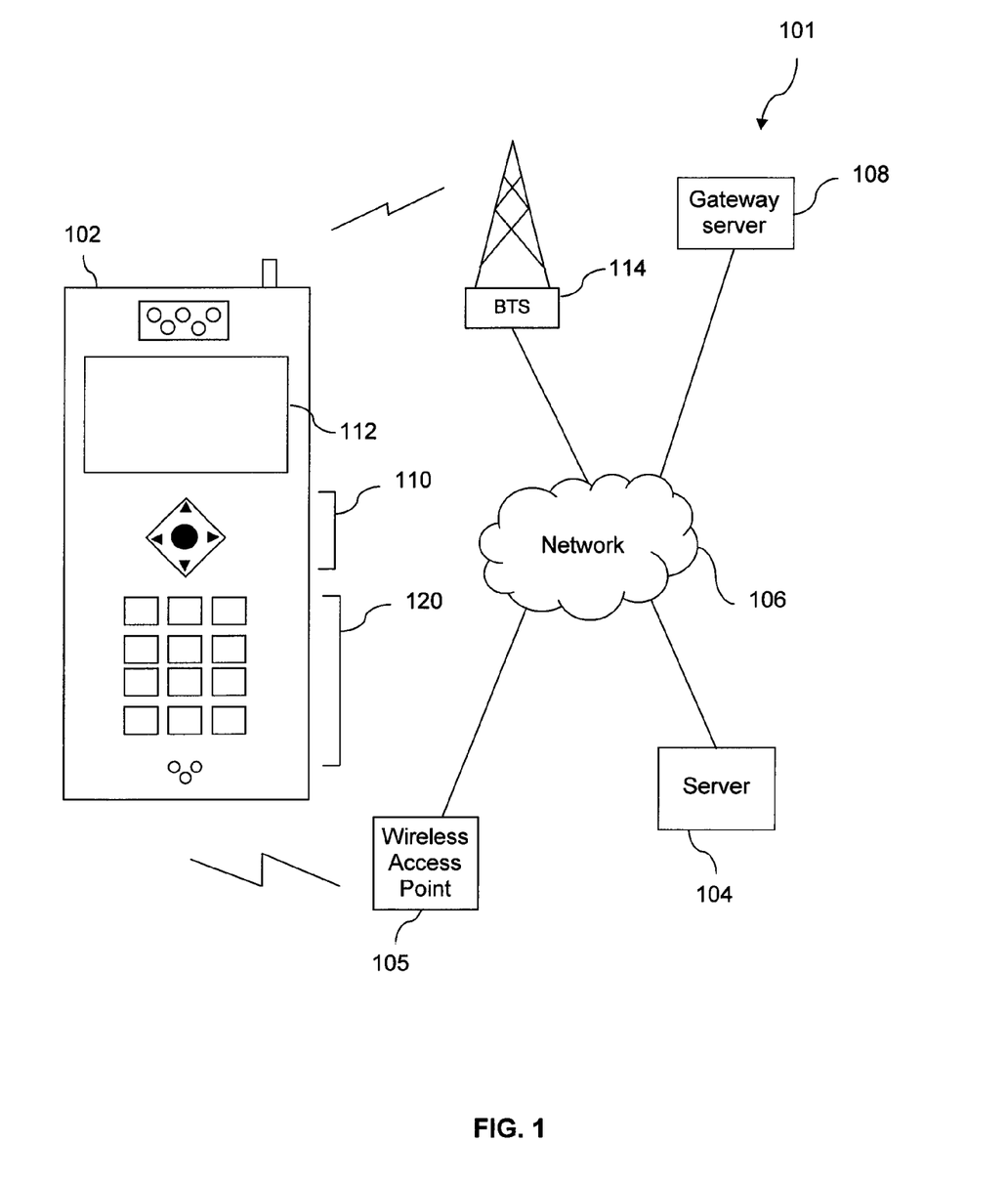
FIG. 1 illustrates an exemplary wireless communication system and mobile device suitable for implementing one or more embodiments of the disclosure.

Now, turning to FIG. 1, a wireless communications system 101 including the mobile communication device 102 is illustrated. The mobile communication device 102 is operable for implementing aspects of the present disclosure, but the present disclosure should not be limited to these implementations. One or more other platforms and/or devices may implement aspects of this disclosure. Though illustrated as a mobile phone, the mobile communication device 102 may take various forms including a wireless mobile device, a pager, a personal digital assistant (PDA), a media player, a gaming device, an inventory control device, a media player, or other. In an embodiment, the present disclosure may have application for other devices or systems that may access a wired or wireless network 106, for example, a desktop computer, a laptop or notebook computer, or other device or system that may or may not be portable. In an embodiment, appropriate modifications to the present disclosure may allow its use on other platforms not specified herein. In this disclosure, the terms "data" and "information" may be used interchangeably.

The mobile communication device 102 includes a visual display 112, touch-sensitive surface and/or keys 120 for input by a user, and/or a button or set of buttons 110 for additional user interaction. The mobile communication device 102 may also contain additional keys, buttons, touch-pads, or touch-sensitive surfaces 120 for additional user input and/or interaction. In some instances, the mobile device may combine user interaction features, such as visual display and touch-sensitive surface and/or other. The mobile communication device 102 may present options for the user to select, controls for the user to actuate, and/or cursors or other indicators for the user to direct. The mobile communication device 102 may further accept data entry from the user, including numbers to dial or various parameter values for configuring the operation of the device. The mobile communication device 102 may further execute one or more software or firmware applications in response to user commands. These applications may configure the mobile communication device 102 to perform various customized functions in response to user interaction. Additionally, the mobile communication device 102 may be programmed and/or configured over-the-air, for example, from a wireless base transceiver station (BTS) 114, a wireless access point 105, or a peer mobile communication device 102.

The mobile communication device 102 may execute a web browser application which enables the display 112 to show a web page. The web page may be obtained via wireless communications with a BTS 114, a wireless network access point 105, a peer mobile communication device 102, or any other wireless communication network or system. While a single base transceiver station 114 is illustrated, it is understood that the wireless communication system 101 may comprise additional base transceiver stations. In some instances, the mobile communication device 102 may be in communication with more than one base transceiver station 114. The base transceiver station 114 (or wireless network access point 105) is coupled to a wireless network 106, such as the Internet. Via the wireless link and the wired network, the mobile communication device 102 has access to information on various servers, such as a server 104. The server 104 may provide content that may be shown on the display 112. The mobile communication device 102 may access information via a gateway server 108. Alternately, the mobile communication device 102 may access the base transceiver station 114 through a peer mobile communication device 102 acting as an intermediary, in a relay type or hop type of connection.

In an embodiment, a user of a mobile communication device 102 may request information, for example, a web page, from a first server 104, via a network 106, through a BTS 114 or a wireless access point 105 or other. The first server 104 may respond with a reply message containing a markup language document. The markup language document may contain details of the web page, which may include links to additional content that may or may not be located on the first server 104.

Figure 2:
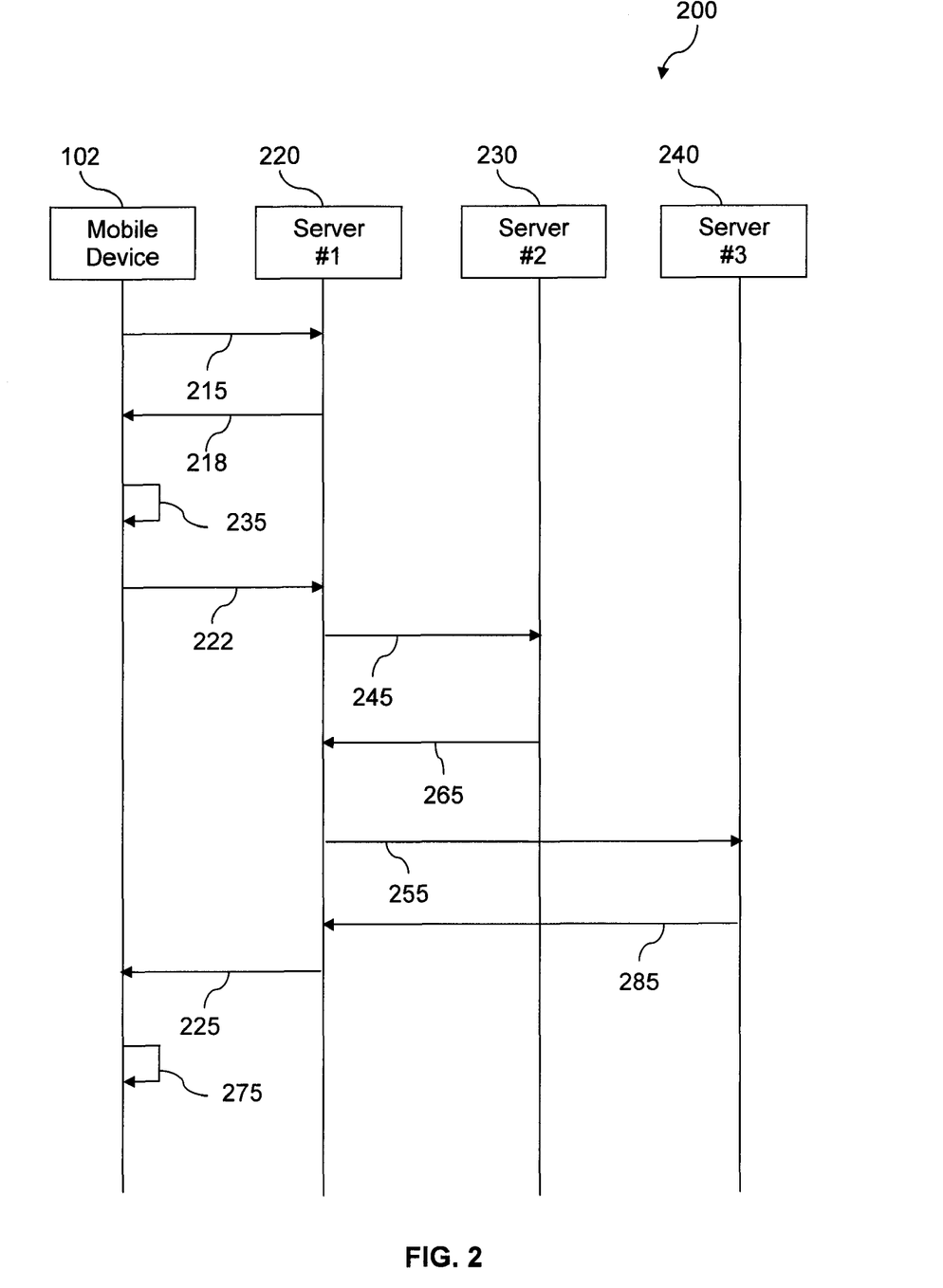
FIG. 2 illustrates a message sequence according to an embodiment of the disclosure.

FIG. 2 illustrates a message sequence 200 exemplary of an embodiment of the disclosure. In an embodiment, the mobile communication device 102 may initiate a first HTTP session with a first server 220 and transmit a request message 215 for information, for example, a web page, from the first server 220 via a network 106. The first server 220 may then send a reply message 218 containing a markup language document to the mobile communication device 102. The first HTTP session is then terminated. The mobile communication device 102 may then process 235 the markup language document and identify any/all embedded links to additional content described therein. The processing 235 may be at least one of parsing, syntactic analysis, or other processing. The embedded links in the markup language document may be links to the first server 220, or to additional servers, such as a second server 230, a third server 240, and so on.

The mobile communication device 102 may then initiate a second HTTP session with the first server 220 and send a second request message 222 containing the parsed list of references and/or links to the first server 220 requesting that the first server 220 manage any/all additional HTTP sessions, as necessary, to collect all available information described in the parsed list of references to complete the web page of request message 215. The second request message 222 may also specify that the first server 220 bundle the information described in the order in which the list of references were ordered in the second request message and deliver it to the mobile communication device 102 via a response message 225.

The first server 220 may then manage any/all HTTP sessions necessary to gather the information of the markup language document. For instance, the first server 220 may establish an HTTP session with a second server 230 and make a request 245 for content associated with a first reference and/or link received in the second request message 222. The second server 230 may then transmit a reply 265 to the first server 220 to fulfill the request 245 by providing the referenced content. The HTTP session between the first server 220 and the second server 230 may then be terminated. The first sever 220 may also establish an HTTP session with a third server 240, transmit a request 255 for content associated with a second reference and/or link received in the second request message 222. The third server 230 may then send a reply 285 content identified by the request 255. The HTTP session between the first server 220 and the third server 240 may then be terminated. Additional HTTP sessions and request/reply communications from additional content servers may continue until all available content identified by the references and/or links contained in the second request message 222 is received by the first server 220. The first server 220 may store the content received from the servers 220, 230 in its own internal memory. The first server 220 may then bundle the content in the order specified by the request message 222 and send the bundled content to the mobile communication device 102 in a reply message 225. The second HTTP session is then terminated.

The mobile communication device 102 may then process 275 the information returned from the server 220 to, for example, present on the display 112 of the mobile communication device 102. The processing 275 may be at least one of parsing, syntactic analysis, or other processing. In an embodiment, an application on the mobile communication device 102 may stitch the information referenced by the links into the markup language document to create an integrated content document and may then invoke a browser to render the integrated content document. In an embodiment, any quantity of HTTP sessions, data, request messages, replies messages, and/or content servers may be employed in order to gather the data of request message 215. In an embodiment, the reply/request messages may be transmitted/received over the link between the mobile communication device 102 and the base transceiver station 114 according to one of a global system for mobile communications (GSM) protocol, a code division multiple access (CDMA) protocol, a universal mobile telecommunications system (UMTS) protocol, a long-term evolution (LTE) protocol, a worldwide microwave access (WiMAX) protocol, and a wireless broadband (WiBro) protocol, or other.

Figure 3:
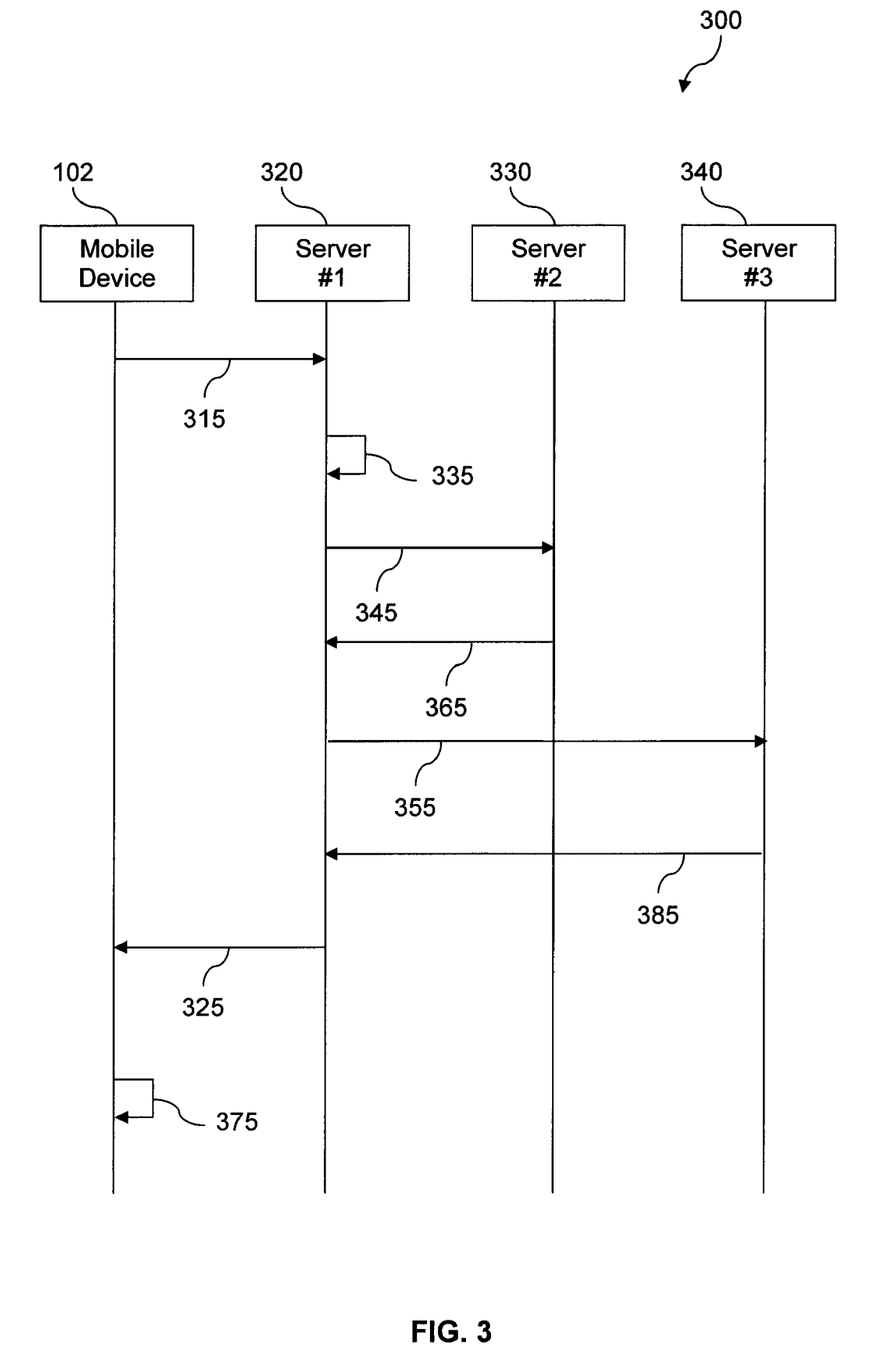
FIG. 3 illustrates a message sequence according to an embodiment of the disclosure.

FIG. 3 illustrates a message sequence 300 according to an embodiment of the disclosure. In an embodiment, the mobile communication device 102 may initiate an HTTP session with a first server 320 and transmit a request message 315 for information, for example, a web page, from the first server 320 via a network 106. The request message 315 may specify that the first server 320 process 335 the markup language document associated with the request message 315. The processing 335 may be at least one of parsing, syntactic analysis, or other processing, and may identify embedded links to content of the web page.

The embedded links contained in the markup language document may reference content stored on the first server 320 and/or on other content servers, such as the second server 330, the third server 340, and/or additional servers. In such instances, the first server 320 may manage any/all HTTP sessions and request/reply communications to gather the information identified by the embedded links contained in the markup language document. For instance, the first server 320 may establish an HTTP session with a second server 330 and make a request 345 for content identified by a first reference and/or link. The second server 330 may then reply to the first server 320 to fulfill the request 345 by providing the identified content. The HTTP session between the first server 320 and the second server 330 may then be terminated. The first sever 320 may also establish an HTTP session with a third server 340, transmit a request 355 for content identified by a second reference and/or link. The first server 320 may receive a reply 385 from the third server containing the content identified by the second reference and/or link by the request 355. The HTTP session between the first server 320 and the third server 340 may then be terminated. Additional HTTP sessions and request/reply communications from additional content servers may continue until all available content referenced by the links embedded in the markup language document is collected.

The server 320 may collect the information of the various reply messages and store it temporarily in, for example, its internal memory until it has gathered all available information of the markup language document. The server 320 may then bundle the information it has collected in the order specified by the links embedded in the markup language document and send it to the mobile communication device 102 in a reply message 325. The mobile communication device 102 may then process 375 the information for one or more uses, for example, presentation on the display 112 of the mobile communication device 102. The processing 375 may be at least one of parsing, syntactic analysis, or other processing. In an embodiment, an application on the mobile communication device 102 may stitch the information referenced by the links into the markup language document to create an integrated content document and may then invoke a browser to render the integrated content document. In an embodiment, the request/reply messages may be transmitted/received over the link between the mobile communication device 102 and the base transceiver station 114 according to one of a global system for mobile communications (GSM) protocol, a code division multiple access (CDMA) protocol, a universal mobile telecommunications system (UMTS) protocol, a long-term evolution (LTE) protocol, a worldwide microwave access (WiMAX) protocol, and a wireless broadband (WiBro) protocol, or other.

Figure 4:
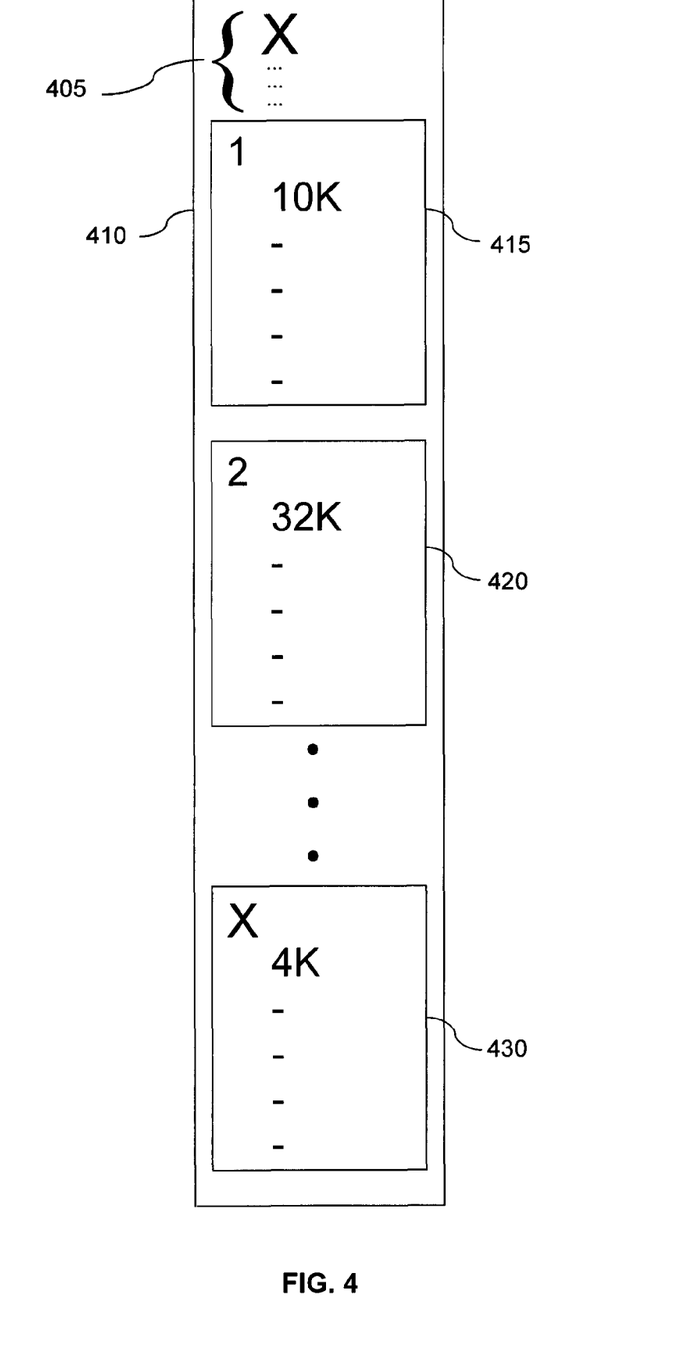
FIG. 4 illustrates an information bundle according to an embodiment of the disclosure.

FIG. 4 depicts a bundle 410 exemplary of that which may be returned in a reply message, such as 225 and/or 325. In an embodiment, the bundle 410 may contain a header 405 with descriptive information of the contents of the bundle 410 to facilitate processing, such as 275 and/or 375. The information of the header 405 may include, but is not limited to information describing the number X of portions of information contained in the bundle 410, the length of the portions of information contained in the bundle, the type of data in the portions of information contained in the bundle, references and/or links contained in the bundle, and meta data or other information to facilitate processing of the bundle by the mobile communication device 102. The bundle 410 may also contain individual portions of information, such as 415, 420, 430, and so on, in the order specified by the markup language document, and may be provided to fulfill an information request. The information may include but is not limited to text, graphics, images, links, and/or other forms of data described in the markup language document.

In some instances, content blocks referenced by embedded links of the markup language document may not be returned due to processing errors. For example, a link to content may no longer be active, the content may no longer be at the referenced location, a server of a referenced location may be inoperative, or for any number of reasons some content blocks may be unavailable. In such instances, the bundle 410 may substitute a reference to the information, such as a website address or other, in place of the requested content.

Figure 5:
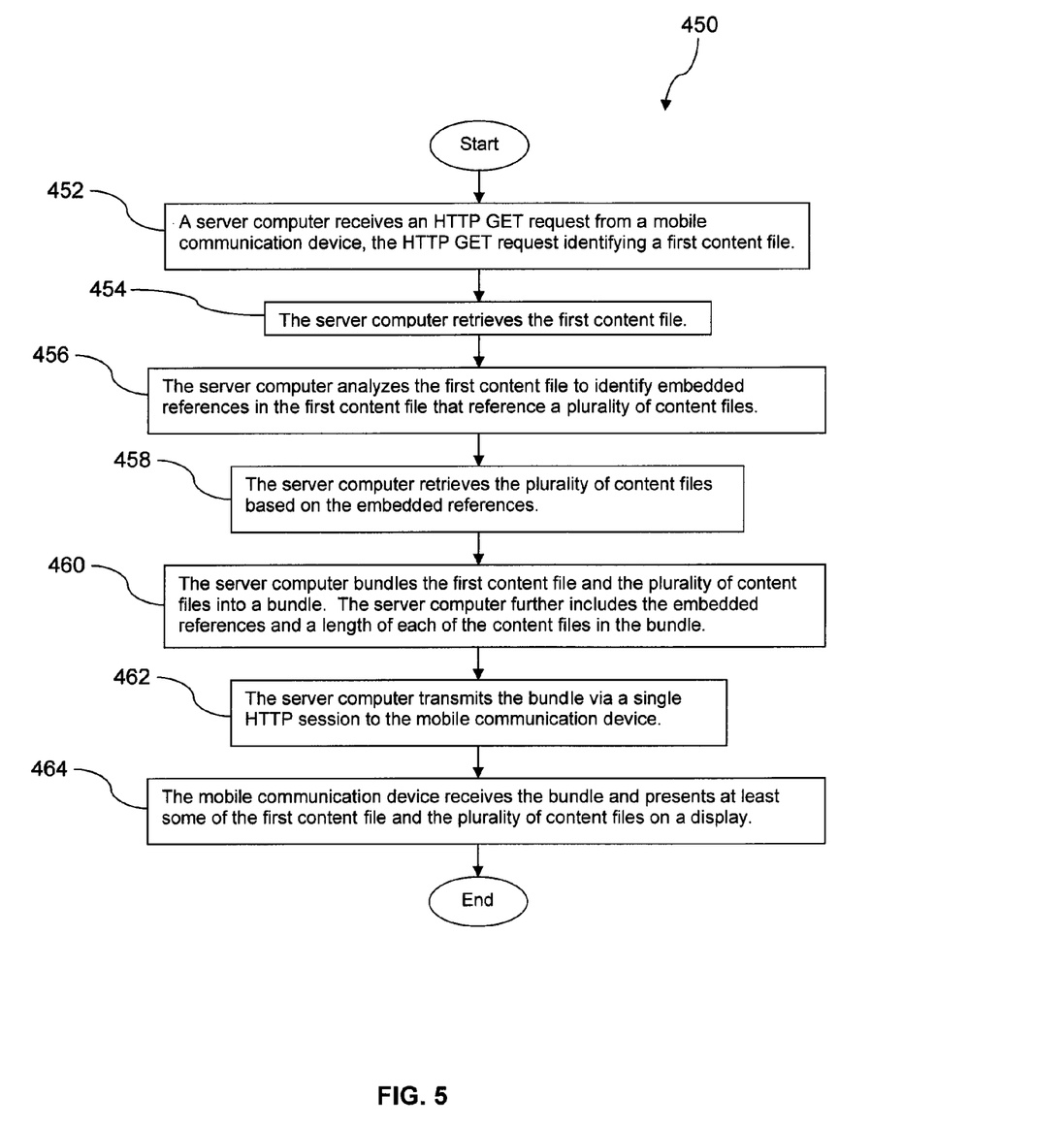
FIG. 5 illustrates a method according to an embodiment of the disclosure.

Turning now to FIG. 5, a method 450 is described. At block 452, the first server 104 receives an HTTP GET message from the mobile communication device 102. In some contexts, the first server 104 may be referred to as a first server computer. The HTTP GET message contains a reference, for example, a uniform resource locator, identifying a first content file. At block 454, the first server 104 retrieves the first content file, for example, by creating a HTTP session with a content server and requesting the first content file from the content server. At block 456, the first server 104 analyzes the first content file to identify embedded references in the first content file that reference a plurality of other content files. The other content files may be text files, image files, audio files, and/or other file format types. In an embodiment, the first server 104 takes note of an order in which the embedded references are discovered when parsing through the first content file from front to back.

At block 458, the first server 104 retrieves the plurality of content files based on the embedded references. For example, the first server 104 creates a plurality of HTTP sessions with one or more content servers and requests each of the plurality of content files referenced by the embedded references in an HTTP GET message. At block 460, the first server 104 bundles the first content file and the plurality of content files into a bundle. In an embodiment, the first content file is located at a first end of the bundle and the plurality of content files referenced by the embedded references are located in the bundle after the first content file in the order noted by the first server 104 during the processing of block 456. In another embodiment, however, the first server 104 may not bundle the first content file and/or the plurality of content files referenced by the embedded references in any particular order. In an embodiment, the first server 104 includes information about the first content file and the plurality of content files referenced by the embedded references. This information may include a reference to the first content file and the embedded references. This information may include a length of the first content file and/or the length of the plurality of content files referenced by the embedded references, for example, a number of bytes in each of the content files or some other quantification of the size of the content files. This information may include an indication of a type of content file for the first content file and/or for the plurality of content files reference by the embedded references.

At block 462, the first server 104 transmits the bundle via a single HTTP session to the mobile communication device 102. In an embodiment, the first server 104 transmits the bundle via a single HTTP data connection to the mobile communication device 102. At block 464, the mobile communication device 102 receives the bundle and presents at least some of the first content file and the plurality of content files on the visual display 112. In an embodiment, the mobile communication device 102 relies upon the first server 104 building the bundle in the order in which the embedded references were encountered when analyzing the first content file. In another embodiment, however, the mobile communication device 102 analyzes the information in the bundle and the first content file itself to sort the plurality of content files.

One skilled in the art will appreciate that other variations of method 450 are within the spirit of the present disclosure. For example, rather than the first server 104 analyzing and/or parsing the first content file, the first server 104 may return the first content file to the mobile communication device 102 which analyzes and/or parses the first content file to identify embedded references to the plurality of content files. In this case, the mobile communication device 102 may send a second HTTP GET request via a HTTP data connection to the first server 104 containing a list of the embedded references. At this point, the first server 104 may reply to the second HTTP GET request as described with reference to blocks 458, 460, and 462.

Figure 6:
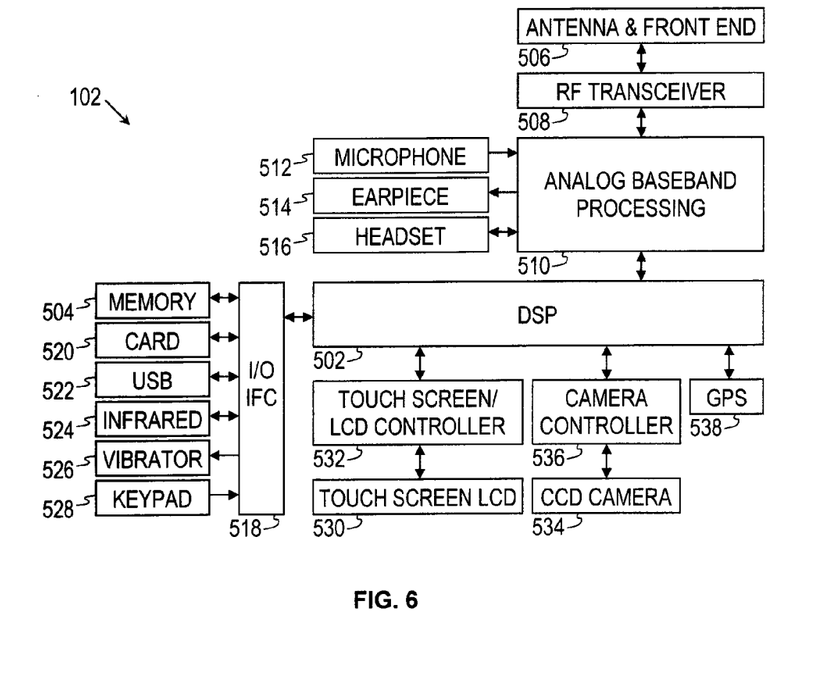
FIG. 6 is a block diagram of a mobile device according to an embodiment of the disclosure.

FIG. 6 shows a block diagram of a mobile communication device 102. While a variety of known components of mobile devices 102 are depicted, in an embodiment a subset of the listed components and/or additional components not listed may be included in the mobile communication device 102. The mobile communication device 102 includes a digital signal processor (DSP) 502 and a memory 504. As shown, the mobile communication device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile communication device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile communication device 102 in accordance with embedded software or firmware stored in memory 504 or stored in memory contained within the DSP 502 itself. In addition to the embedded software or firmware, the DSP 502 may execute other applications stored in the memory 504 or made available via information carrier media, such as portable data storage media like the removable memory card 520 or via wired or wireless network 106 communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile communication device 102 to send and receive information from a radio access network (RAN) or some other available wireless communications network or from a peer mobile communication device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality, such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 106, portions of the antenna and front end 506, and the analog baseband processing unit 510 may be combined in one or more processing units and/or application-specific integrated circuits (ASICs).

The analog baseband processing unit 510 may provide various analog processing of inputs and outputs, for example, analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile communication device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example, by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example, in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example, in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network 106 via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile communication device 102 to function as a peripheral device to exchange information with a personal computer or other computer system. The infrared port 524 and other optional ports, such as a Bluetooth interface or an IEEE 802.11 compliant wireless interface may enable the mobile communication device 102 to communicate wirelessly with other nearby mobile devices and/or wireless base stations.

The input/output interface 518 may further connect the DSP 502 to the vibrator 526 that, when triggered, causes the mobile communication device 102 to vibrate. The vibrator 526 may serve as a mechanism for silently alerting the user to any of various events, such as an incoming call, a new text message, and an appointment reminder.

The keypad 528 couples to the DSP 502 via the interface 518 to provide one mechanism for the user to make selections, enter information, and otherwise provide input to the mobile communication device 102. Another input mechanism may be the touch screen LCD 530, which may also display text and/or graphics to the user. The touch screen LCD controller 532 couples the DSP 502 to the touch screen LCD 530.

The CCD camera 534 enables the mobile communication device 102 to take digital pictures. The DSP 502 communicates with the CCD camera 534 via the camera controller 536. The GPS sensor 538 is coupled to the DSP 502 to decode global positioning system signals, thereby enabling the mobile communication device 102 to determine its position. In another embodiment, a camera operating according to a technology other than charge coupled device cameras may be employed. Various other peripherals may also be included to provide additional functions, e.g., radio and television reception.

Figure 7:
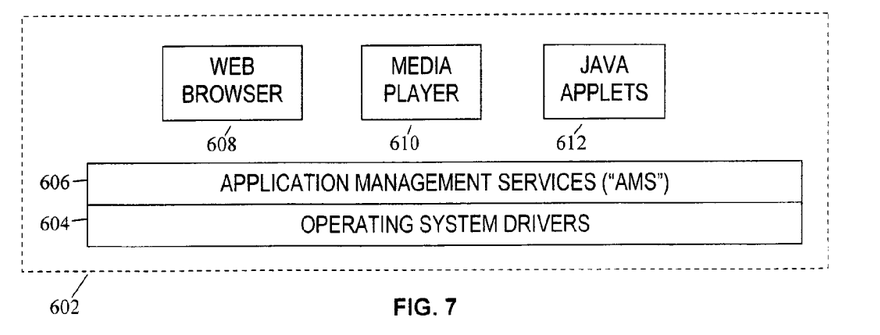
FIG. 7 is a block diagram of a software architecture of a mobile device according to an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the mobile communication device 102. Also shown in FIG. 7 are a web browser application 608, a media player application 610, and JAVA applets 612. The web browser application 608 configures the mobile communication device 102 to operate as a web browser, allowing a user to enter information into forms and select links to retrieve and view web pages. The media player application 610 configures the mobile communication device 102 to retrieve and play audio or audiovisual media. The JAVA applets 612 configure the mobile communication device 102 to provide games, utilities, and other functionality.

Figure 8:
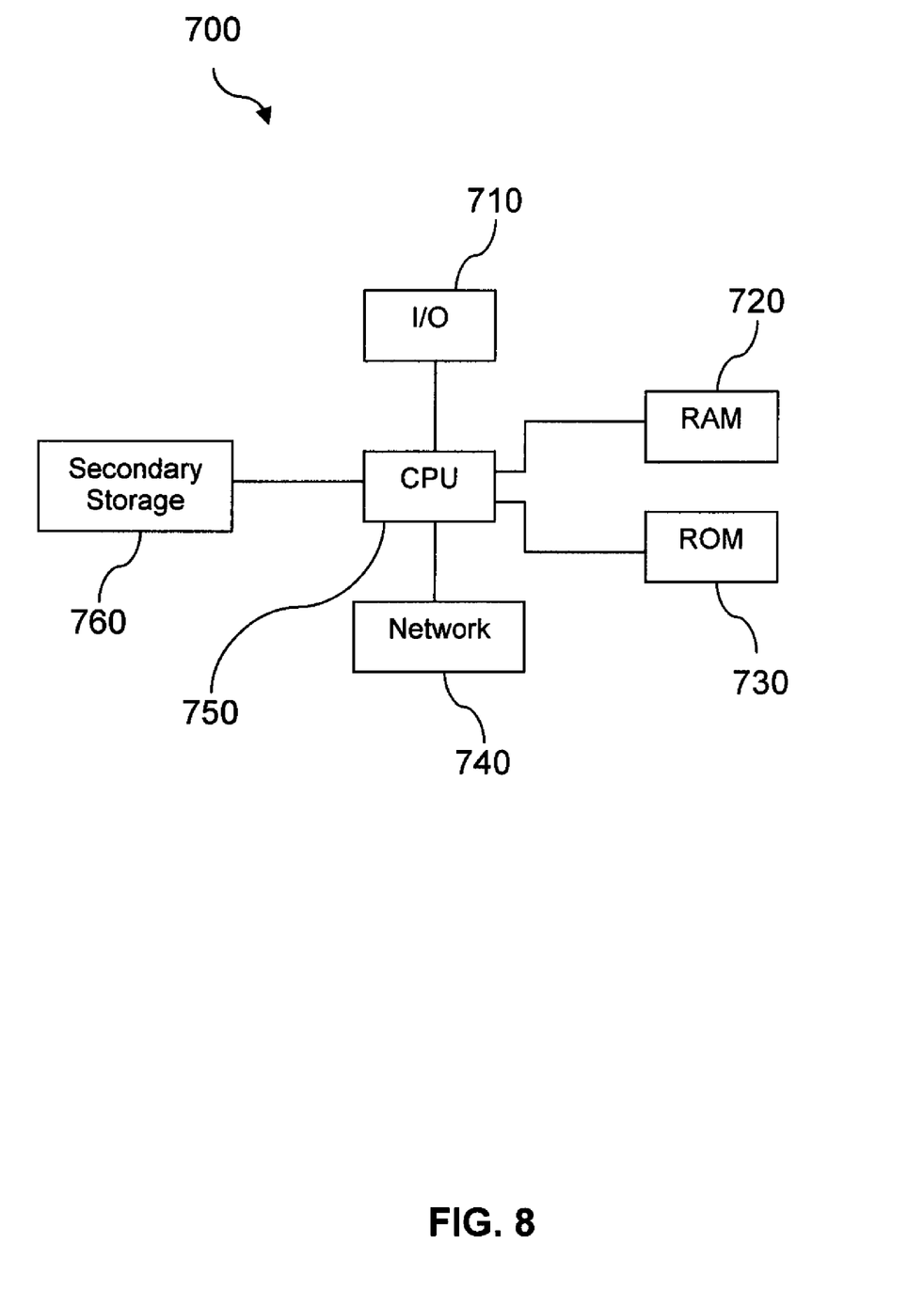
FIG. 8 illustrates an exemplary computer system suitable for implementing an embodiment of the disclosure.

FIG. 8 illustrates a computer system 700 suitable for implementing one or more embodiments disclosed herein. The computer system 700 includes a processor 750 (which may be referred to as a central processor unit or CPU) that is in communication with memory devices including secondary storage 760, read only memory (ROM) 730, random access memory (RAM) 720, input/output (I/O) devices 710, and network connectivity devices 740. The processor 750 may be implemented as one or more CPU chips.

It is understood that by programming and/or loading executable instructions onto the computer system 700, at least one of the CPU 750, the RAM 720, and the ROM 730 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example, in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 760 is typically comprised of one or more disk drives or tape drives and is used for non-volatile storage of data and as an over-flow data storage device if RAM 720 is not large enough to hold all working data. Secondary storage 760 may be used to store programs which are loaded into RAM 720 when such programs are selected for execution. The ROM 730 is used to store instructions and perhaps data which are read during program execution. ROM 730 is a non-volatile memory device which typically has a small memory capacity relative to the larger memory capacity of secondary storage 760. The RAM 720 is used to store volatile data and perhaps to store instructions. Access to both ROM 730 and RAM 720 is typically faster than to secondary storage 760.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 740 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 740 may enable the processor 750 to communicate with an Internet or one or more intranets. With such a network connection, it is contemplated that the processor 750 might receive information from the network, or might output information to the network in the course of performing the above-described method steps. Such information, which is often represented as a sequence of instructions to be executed using processor 750, may be received from and outputted to the network, for example, in the form of a computer data signal embodied in a carrier wave.

Such information, which may include data or instructions to be executed using processor 750, for example, may be received from and outputted to the network, for example, in the form of a computer data baseband signal or signal embodied in a carrier wave. The baseband signal or signal embodied in the carrier wave generated by the network connectivity devices 740 may propagate in or on the surface of electrical conductors, in coaxial cables, in waveguides, in an optical conduit, for example, an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 750 executes instructions, codes, computer programs, scripts which it accesses from hard disk, floppy disk, optical disk (these various disk based systems may all be considered secondary storage 760), ROM 730, RAM 720, or the network connectivity devices 740. While only one processor 750 is shown, multiple processors may be present. Thus, while instructions may be discussed as executed by a processor, the instructions may be executed simultaneously, serially, or otherwise executed by one or multiple processors.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example, analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 760, to the ROM 730, to the RAM 720, and/or to other non-volatile memory and volatile memory of the computer system 700. The processor 750 may process the executable instructions and/or data in part by directly accessing the computer program product, for example, by reading from a CD-ROM disk inserted into a disk drive peripheral of the computer system 700. The computer program product may comprise instructions that promote the loading and/or copying of data, data structures, files, and/or executable instructions to the secondary storage 760, to the ROM 730, to the RAM 720, and/or to other non-volatile memory and volatile memory of the computer system 700.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, for instance a desktop computer or other device or system that may access a wireless network 106, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
   a processor,
   a memory,
   a display,
   a radio transceiver, and
   an application stored in the memory that, when executed by the processor,
      transmits via the radio transceiver a first hyper text transport protocol message identifying a markup language content file embedding a plurality of links to additional content, wherein the first hyper text transport protocol message establishes a single hyper text transport protocol connection,
      receives via the radio transceiver a second hyper text transport protocol message from the single hyper text transport protocol connection containing the markup language content file and a plurality of files identified by the links to additional content, wherein the markup language content file and the plurality of files are received via the single hyper text transport connection, and
      presents the markup language content file and the plurality of files on the display.

2. The mobile communication device of claim 1, wherein the mobile communication device is one of a mobile phone, a personal digital assistant, and a media player.

3. The mobile communication device of claim 1, wherein the second hyper text transport protocol message further contains meta data identifying how many files identified by the links are contained and the length of each of the contained files identified by the links.

4. The mobile communication device of claim 3, wherein the meta data further identifies the type of each of the contained files identified by the links.

5. The mobile communication device of claim 1, wherein the markup language content file is one of a hyper text markup language content file and an extensible markup language content file.

6. The mobile communication device of claim 1, wherein the radio transceiver communicates with a public land mobile network and transmits the first hyper text transport protocol message and receives the second hyper text transport protocol message according to a public land mobile network communication protocol selected from the group consisting of a global system for mobile communications protocol, a code division multiple access protocol, a universal mobile telecommunications system protocol, a long-term evolution protocol, a worldwide microwave access protocol, and a wireless broadband protocol.

7. A server computer, comprising:
   a processor;
   a memory; and
   an application stored in the memory that, when executed by the processor,
      receives a first hyper text transport protocol message identifying a markup language content file embedding a plurality of links to additional content, wherein the first hyper text transport protocol message establishes a single hyper text transport protocol connection,
      retrieves the markup language content file,
      parses the markup language content file to identify the embedded links,
      retrieves at least one subordinate file based on at least one of the embedded links,
      bundles the markup language content file and the at least one subordinate file into a bundle, and
      transmits a second hyper text transport protocol message via the single hyper text transport protocol connection containing the bundle, wherein the markup language content file and the at least one subordinate file are transmitted via the single hyper text transport connection.

8. The server computer of claim 7, wherein the application further combines meta data with the bundle, wherein the meta data identifies the markup language content file and identifies the at least one subordinate file.

9. The server computer of claim 8, wherein the meta data further identifies the length of the markup language content file and the length of the at least one subordinate file.

10. The server computer of claim 8, wherein the meta data identifies the number of subordinate files contained in the bundle.

11. The server computer of claim 8, wherein the meta data further identifies the type of the at least one subordinate file.

12. The server computer of claim 7, wherein the at least one subordinate file comprises at least a first subordinate file and a second subordinate file, and wherein the application bundles the first subordinate file and the second subordinate file into the bundle in the order that the links to the first subordinate file and the second subordinate file are parsed in the markup language content file.

13. The server computer of claim 12, wherein the application further combines meta data with the bundle, wherein the meta data identifies the markup language content file, identifies the first subordinate file, identifies the second subordinate file, identifies the length of the first subordinate file, and identifies the length of the second subordinate file, wherein the meta data about the length of the first subordinate file is placed in the bundle before and proximate to the first subordinate file, and wherein the meta data about the length of the second subordinate file is placed in the bundle before and proximate to the second subordinate file.

14. The server computer of claim 7, wherein the markup language content file is a hyper text markup language file.

15. The server computer of claim 7, wherein the markup language content file is an extensible markup language file.

16. The server computer of claim 7, wherein the first hyper text transport protocol message indicates that the source of the first hyper text transport protocol message is a mobile electronic device.

17. A method of providing content, comprising:
   a server computer retrieving a plurality of content files;
   the server computer bundling the plurality of content files together into a bundle, the bundle further comprising a plurality of references, each reference identifying a source of one of the content files, the bundle further identifying a length of each content file and a type of each content file; and
   the server computer transmitting the bundle via a single hyper text transport protocol session to a mobile communication device.

18. The method of claim 17, further comprising:
   the server receiving a hyper text transport protocol get request from the mobile communication device;
   the server retrieving a first content file identified by the hyper text transport protocol get request; and
   the server analyzing the first content file to identify embedded references in the first content file, wherein the embedded references identify the plurality of content files.

19. The method of claim 17, further comprising the server receiving a hyper text transport protocol get request from the mobile communication device, wherein the get request comprises a plurality of references that identify the plurality of content files.

20. The method of claim 17, wherein the hyper text transport protocol session is a data connection.

\* \* \* \* \*